Patented Dec. 29, 1953

2,664,421

UNITED STATES PATENT OFFICE 2,664,421

PROCESS FOR INCREASING THE SOLUBILITY OF RIBOFLAVIN

Leo A. Flexser, Upper Montclair, and Walter G. Farkas, Nutley, N. J., assignors to Hoffmann-La Roche Inc., Nutley, N. J., a corporation of New Jersey No Drawing. Application April 18, 1951, Serial No. 221,734

7 Claims. (Cl. 260—211.3)

This invention relates to riboflavin possessing high solubility characteristics and to a method for preparing the same.

Riboflavin is normally a yellow to orange-yellow crystalline powder, only slightly soluble in water (12 mg. in 100 cc. at 27.5° C.). We have now found that water-solubility of riboflavin can be increased many fold. Thus, starting from riboflavin having a solubility of about 120 mg. per liter, we have produced riboflavin having a solubility of about 1,200 mg. per liter.

The process for rendering riboflavin more soluble, comprises dissolving riboflavin in a solvent selected from the group consisting of molten phenol, liquefied phenol, and strong formic acid; and then precipitating the riboflavin in the presence of a precipitant selected from the group consisting of lower alkyl ethers, dichloroethyl ether, and mixtures thereof. A sufficient quantity of the precipitant is employed to effect substantially complete precipitation of the riboflavin. The precipitated riboflavin is readily separated in any suitable manner, e. g., by filtration. By "strong formic" acid is meant the commercial acid containing from about 10 per cent to about 15 per cent water. By "liquefied phenol" is meant a solution of about 10 per cent water in phenol, which is liquid at room temperature. The preferred solvent for dissolving the riboflavin is liquefied phenol. As the precipitant, isopropyl ether is preferred.

When anhydrous phenol is employed as the solvent for the riboflavin, the phenol is warmed until molten, the riboflavin is dissolved therein, and the resulting solution poured into isopropyl ether, whereupon rapid precipitation of the riboflavin occurs. When liquefied phenol is employed, the riboflavin readily dissolves therein at room temperatures. The employment of liquefied phenol is preferred over anhydrous phenol because of convenience in handling. The riboflavin precipitate is filtered, washed with isopropyl ether, and dried. The high solubility riboflavin thus obtained has a yellow color. When excess is shaken with water at room temperature, a concentration of about 1.2 gm. per liter is quickly attained. The solution remains stable for several days even in the presence of excess solid phase.

The following examples will serve to illustrate the invention.

Example 1

To 500 cc. of liquefied phenol U. S. P. were added 50 grams of riboflavin having a solubility in water of about 120 mg. per liter. The mixture was stirred until solution was obtained. To the resulting solution 5 liters of isopropyl ether were quickly added with agitation. Immediate precipitation of riboflavin occurred and the slurry became slightly warm. The slurry was filtered and the filter cake washed repeatedly with five 400 cc. portions of isopropyl ether until completely free from phenol. The filter cake was spread out in a thin layer on a tray and dried at room temperature to about 45° C. until free from odor, and then finally dried for 12 hours at 100° C. and pulverized. The riboflavin thus obtained had a solubility of about 1.2 gm. per liter of water at room temperature.

Example 2

The procedure of Example 1 was repeated, except that instead of adding the isopropyl ether to the solution of riboflavin in the liquefied phenol, the phenol-riboflavin solution was added with agitation to the isopropyl ether. The riboflavin obtained was found to have the same high water solubility.

Example 3

One gram of riboflavin having a solubility in water of about 120 mg. per liter was dissolved in 10 cc. of liquefied phenol. The resulting solution was added to 100 cc. of ethyl ether. The precipitated riboflavin was filtered, washed with ethyl ether, and dried. The product had a solubility of 1.2 gm. per liter of water.

Example 4

One gram of riboflavin having a solubility in water of about 120 mg. per liter was dissolved in 10 cc. of liquefied phenol. The resulting solution was added to 100 cc. of di-n-butyl ether. The precipitated riboflavin was filtered, washed with di-n-butyl ether, and dried. The product had a solubility of 1.2 gm. per liter of water.

Example 5

One gram of riboflavin having a solubility in water of about 120 mg. per liter was dissolved in 10 cc. of liquefied phenol. The resulting solution was added to 100 cc. of dichloroethyl ether. The precipitated riboflavin was filtered, washed with dichloroethyl ether, and dried. The product had a solubility of 1.15 gm. per liter of water.

Example 6

One gram of riboflavin having a solubility in water of about 120 mg. per liter was dissolved in 10 grams of phenol by heating to about 90° C. The hot solution was added to 100 cc. of isopropyl ether with cooling. The precipitated riboflavin was filtered, washed with isopropyl ether, and dried. The product had a solubility of 1.29 gm. per liter of water.

*Example 7*

One gram of riboflavin having a solubility in water of about 120 mg. per liter was dissolved in 10 cc. of 88 per cent formic acid by heating to about 90° C. The hot solution was added to 100 cc. of isopropyl ether with cooling. The precipitated riboflavin was filtered, washed with isopropyl ether, and dried. The product had a solubility of 1.19 gm. per liter of water.

We claim:

1. A process for increasing the water-solubility of riboflavin, which comprises dissolving riboflavin in a solvent selected from the group consisting of molten phenol, liquefied phenol containing about 10 per cent water in phenol, and strong formic acid containing from about 10 per cent to about 15 per cent water, and precipitating riboflavin from the solution with a precipitant selected from the group consisting of a lower alkyl ether and dichloroethyl ether.

2. A process as in claim 1, wherein the solvent is liquefied phenol containing about 10 per cent water in phenol and the precipitant is a lower alkyl ether.

3. A process as in claim 1, wherein the solvent is liquefied phenol containing about 10 per cent water in phenol and the precipitant is isopropyl ether.

4. A process as in claim 1, wherein the solvent is strong formic acid and containing from about 10 per cent to about 15 per cent water and the precipitant is isopropyl ether.

5. A process as in claim 1, wherein the solvent is molten phenol and the precipitant is isopropyl ether.

6. A process as in claim 1, wherein the solvent is liquefied phenol containing about 10 per cent water in phenol and the precipitant is ethyl ether.

7. A process as in claim 1, wherein the solvent is liquefied phenol containing about 10 per cent water in phenol and the precipitant is dichloroethyl ether.

LEO A. FLEXSER.
WALTER G. FARKAS.

References Cited in the file of this patent

UNITED STATES PATENTS

| Number | Name | Date |
|---|---|---|
| 2,449,003 | Moos et al. | Sept. 7, 1948 |
| 2,603,633 | Dale | July 15, 1952 |

OTHER REFERENCES

Merck Index—5th Edition, 1940, page 421.